United States Patent [19]

Åkerblom

[11] 4,387,339
[45] Jun. 7, 1983

[54] METHOD AND APPARATUS FOR MEASURING THE SPACING BETWEEN THE OPPOSED SURFACES OF SEPARATED ELEMENTS

[75] Inventor: Bengt O. Åkerblom, Hägersten, Sweden

[73] Assignee: Sunds Defibrator AB, Stockholm, Sweden

[21] Appl. No.: 155,207

[22] Filed: Jun. 2, 1980

[30] Foreign Application Priority Data

May 6, 1979 [SE] Sweden ............... 7904903

[51] Int. Cl.³ ............................... G01B 7/14
[52] U.S. Cl. .................................. 324/207
[58] Field of Search ............ 324/207, 208, 228, 229, 324/243

[56] References Cited

U.S. PATENT DOCUMENTS 3,035,782  5/1966  Burbank .............. 324/208

3,609,527  9/1971  Ellis ..................... 324/207

FOREIGN PATENT DOCUMENTS 154908  10/1951  Australia .............. 324/208

Primary Examiner—Gerard R. Strecker
Assistant Examiner—Walter E. Snow
Attorney, Agent, or Firm—Eric Y. Munson

[57] ABSTRACT

Method and device for measuring of the spacing between two opposite surfaces (10, 12) of magnetically conductive material according to the reluctance method by means of a position indicator (14). An indicator with two coils (22, 24) is used, which coils are supplied with current so as to work in opposite directions and the currents are controlled so as to keep resultant magnetic flux through a DC field meter (30) positioned between the coils all the time equal to zero. The measuring result is obtained by measuring the difference between the currents fed to the coils (22, 24).

6 Claims, 2 Drawing Figures

METHOD AND APPARATUS FOR MEASURING THE SPACING BETWEEN THE OPPOSED SURFACES OF SEPARATED ELEMENTS

BACKGROUND OF THE INVENTION

The present invention relates to a method and apparatus for measuring the spacing between two separated elements, as for example, for indicating a gap width between the grinding discs of a grinding apparatus for preventing metallic contact between the discs.

It is known previously for measuring of the spacing between two discs of magnetic material to measure the reluctance (the magnetic resistance) in an electric circuit by means of an inductive position indicator disposed in one of the discs, in the air gap between the indicator and the opposite disc forming part of the circuit. The inductance or the coupling intensity of one or two coils is measured by supplying and measuring an alternating current. However, this method has the drawback that great losses of iron are caused both in the indicator and the opposite disc. The iron losses result in great dependence on temperature and deteriorated magnetic conductivity of the iron. In order to eliminate the iron losses and the solving problem of dependence on temperature the measuring of the reluctance can be performed by means of DC fields. However, this involves the drawbacks that the indicator becomes susceptible to external disturbing fields, and in addition the deflection of the indicator becomes dependent on the remanence inherent to the indicator and the disc material. The method involves also that great demands on the DC field meter regarding stability when an absolute value of the field intensity shall be measured.

SUMMARY OF THE INVENTION

The main object of the invention is to provide a novel method and a novel apparatus for measuring spacing according to the method employing DC fields described in the background herein, and this is achieved by the method and the device according to the invention having been imparted the characteristic features stated in the subsequent claims.

BRIEF DESCRIPTION OF THE DRAWINGS

In the following the invention will be described nearer with reference to an embodiment shown in the accompanying drawing.

DETAILED DESCRIPTION OF THE PREFERRED EMBODIMENT

Figure 1:
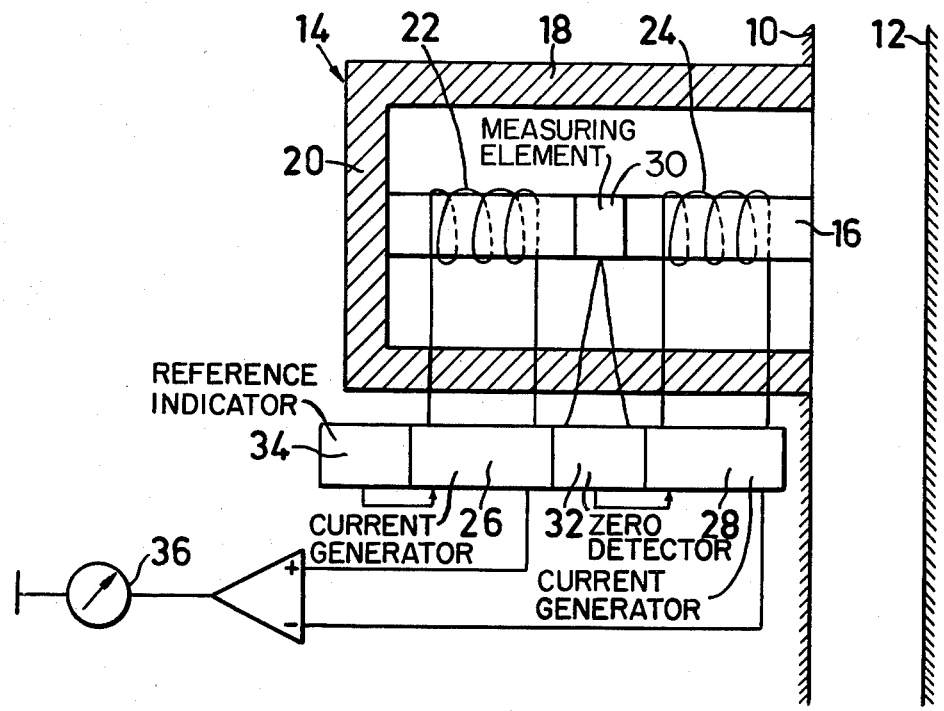
FIG. 1 shows diagrammatically a circuit layout for the measuring device according to the invention.

In the drawing, the novel device according to the invention is shown installed in one of two surfaces 10, 12 between which a spacing shall be controlled. The surfaces may be, for example, the surfaces of grinding members, e.g. the grinding discs of a grinding apparatus such as a refiner of the type shown and described in, for example, the U.S. Pat. No. 3,212,721 and which grinding discs are formed with ridges or the like. Such grinding discs are rotatable in relation to one another, and preferably consist of a rotationally stationary grinding disc and a rotating one, the device according to the invention being positioned in the surface 10 of the stationary grinding disc (not shown). The spacing between the grinding surfaces then constitutes a standard for the intensity of the grinding.

Inserted into the surface 10 is a position indicator 14 having a core 16 of a material highly permeable to magnetic action and a cylinder 18 also consisting of highly permeable material. The core 16 and the cylinder 18 are interconnected at the rear part denoted 20 of the transmitter 14. Disposed about the core 16 are two windings or coils 22 and 24 which are fed from associated current generators shown diagrammatically and denoted 26 and 28, respectively. Disposed between the windings 22 and 24 is a measuring element 30 for measuring DC fields, which element through a zero detector 32 is connected to the current generator 28. Connected to the current generator 28 is a reference indicator 34, and wires lead from the current generators 26, 28 to a measuring instrument 36.

The device shown and described hereinbefore becomes operative in the following manner: The two coils 22, 24 are caused to work in opposite directions, and the purpose of this arrangement is to obtain a balanced system. This implies that the resulting flux through the measuring element 30 all the time is kept equal to zero.

When the spacing between the surfaces 10 and 12 is changed so that the reluctance for that part of the indicator 14 which is fed from the coil 24, is changed, a magnetic flux is started through the measuring element 30. This latter reacts to the flux and directs, via the zero detector 32, the current generator 28 which changes its current to coil 24 so that the resulting flux through the measuring element again becomes equal to zero. An output signal is obtained by measuring the difference between the currents supplied to the coils 22, 24. The method with zero detection of the magnetic flux through the measuring element 30 involves that no greater demands on the stability of the same need be put (Hall element or equipment for survey of distortion).

In a grinding apparatus the surfaces 10 and 12 are worn down. Therefore, the indicator 14 may be formed adjacent the surface 10 as a wear body, which is worn down at the same rate as the surface 10. In this way the circuit for the magnetic field always will comprise the factual spacing between the surfaces 10 and 12.

When the surfaces 10 and 12 consist of grinding surfaces, for example, the material to be ground between them exercises a certain force against the surfaces at right angles to the planes thereof, the so-called grinding pressure. If e.g. the surfaces come into contact with each other or foreign articles come in between the grinding discs, the grinding pressure becomes exceptionally high, and this results in a strong wear on the grinding surfaces. Provided that the indicator then is forced into a bore in the carrier for the one grinding disc, the force fit between the indicator and the bore in the grinding disc can be selected so that the indicator is forced down by the increased grinding pressure.

The current supply to the coils 22, 24 is effected with alternating current having a substantially constant magnitude in both the positive and negative directions and having a frequency sufficiently low so as to avoid losses by eddy currents. The method using alternating fields having substantially constant magnitudes in both the positive and negative directions eliminates problems created by stationary interference fields such as the terrestrial magnetic field, and reduces also the dependence on remanence when the measuring concerns steel surfaces. The alternation necessitates, however, that the zero detector 32 is imparted reverse polarity synchroneously with the alternations.

Figure 2:
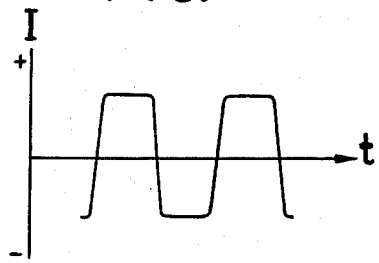
FIG. 2 shows a preferred current curve.

The current supplied to the coils 22, 24 preferably should have the shape of a so-called square wave according to FIG. 2 wherein I denotes current magnitude and t is time, and a frequency between 1 and 100 c.p.s. (cycles per second). Since the current magnitude is constant during so long time as possible, the measuring of the same is rendered easier.

The balanced measuring system described and shown above eliminates the problems stated hereinbefore and offers an indicator stable with regard to temperature, time and material. It is obvious that the shown embodiment is one way only to realize the inventive idea and that changes and variations are possible within the scope of the subsequent claims.

I claim:

1. In the method of measuring the spacing between two opposing surfaces of magnetically conductive material according to the reluctance method by means of a position indicator arranged in one of said surfaces and oriented in relation to the other one of said surfaces so that the gap between the two surfaces form part of a magnetic field circuit, the improvement comprising:

providing first and second separate coil windings about a common core of said position indicator, connecting first and second current generators to said first and second coils, respectively, such that the direction of current flow through said first coil is opposite the direction of current flow through said second coil, so that said first and second coils produce opposed magnetic fields, detecting the net magnetic flux between said first and second coils, regulating the current flow through one of said first and second coils until no net magnetic flux is detected between said first and second coils, and measuring the difference between the current from said first and second current generators for providing an output signal corresponding to the spacing between said two surfaces.

2. A method according to claim 1, including the step of feeding each of said first and second coils with alternating currents having substantially constant magnitudes in both the positive and negative directions.

3. A method according to claim 2, wherein said currents having a frequency in the range of one to one hundred cycles per second.

4. In an apparatus for measuring the spacing between two opposing surfaces of magnetically conductive material according to the reluctance method by means of a position indicator arranged in one of said surfaces and oriented in relation to the other one of said surfaces so that the gap between the two surfaces forms part of a magnetic field circuit, the improvement comprising:

first and second coil windings wound around a common core of said position indicator, first and second current generators coupled to said first and second coils respectively, said first and second current generators being connected to said first and second coils such that the current flow through said first coil is opposite in direction of the current flow through said second coil so that said first and second coils produce opposed magnetic fields, means disposed between said coils for detecting the magnetic flux between said first and second coils, means responsive to the detection of a net magnetic flux between said first and second coils for adjusting the current flow through one of said first and second coils until no net magnetic flux is detected between said first and second coils, and means coupled to said first and second current generators for measuring the difference in current flow from said first and second current generators for providing an output signal corresponding to the spacing between said two surfaces.

5. An apparatus according to claim 4, wherein the portion of the position indicator (14) facing the gap to be measured is formed as a wear body which is worn down at the same rate as the surface to which said position indicator is mounted.

6. An apparatus according to claim 4, wherein the position indicator (14) is forced down into a bore in one of said measuring surfaces or a carrier thereof so that the position indicator is forced back when said one surface is exposed to great force at right angle to the plane of said one surface.

* * * * *